US006936973B2

(12) United States Patent
Parra, Sr. et al.

(10) Patent No.: US 6,936,973 B2
(45) Date of Patent: Aug. 30, 2005

(54) SELF-OSCILLATING CONSTANT-CURRENT GAS DISCHARGE DEVICE LAMP DRIVER AND METHOD

(76) Inventors: Jorge M. Parra, Sr., 10721 Skyhawk Dr., New Port Richey, FL (US) 34654; Jorge M. Parra, Jr., 10721 Skyhawk Dr., New Port Richey, FL (US) 34654; Shmuel Ben-Yaakov, Ben-Gurion University of the Negev, P.O. Box 653, Beer-Sheva (IL), 84105

( * ) Notice: Subject to any disclaimer, the term of this patent is extended or adjusted under 35 U.S.C. 154(b) by 82 days.

(21) Appl. No.: 10/447,284

(22) Filed: May 29, 2003

(65) Prior Publication Data

US 2004/0007986 A1 Jan. 15, 2004

Related U.S. Application Data

(60) Provisional application No. 60/384,079, filed on May 31, 2002.

(51) Int. Cl.[7] ............................................. H05B 37/00
(52) U.S. Cl. ................................... 315/209 R; 315/224
(58) Field of Search ............................... 315/224, 225, 315/291, 307, 308, 219, 276, 244, 209 R, 312, 320, 324, 318

(56) References Cited

U.S. PATENT DOCUMENTS

| | | |
|---|---|---|
| 1,963,963 A | 6/1934 | Barclay |
| 2,139,815 A | 12/1938 | Fodor |
| 3,975,660 A | 8/1976 | Knobel et al. |
| 4,005,330 A | 1/1977 | Glascock, Jr. et al. |
| 4,010,400 A | 3/1977 | Hollister |
| 4,189,661 A | 2/1980 | Haugsjaa et al. |
| 4,196,374 A | 4/1980 | Witting |
| 4,266,167 A | 5/1981 | Proud et al. |
| 4,410,930 A | 10/1983 | Yachabach |
| 4,427,923 A | 1/1984 | Proud et al. |

(Continued)

OTHER PUBLICATIONS

Peter N. Wood and Gerry Limjuco, "Simple Electronic Ballast Using IR2155 MOS Gate Driver". *International Rectifier Publication Application Notes*, No. DT 94–3, pp. 1–11.

Peter N. Wood, "Electronic Ballasts Using the Cost–Saving IR2155 Driver", *International Rectifier Publication Application Notes*, No. AN–995. pp. 1–3.

*Primary Examiner*—Wilson Lee
(74) *Attorney, Agent, or Firm*—Jim Zegeer

(57) ABSTRACT

A high frequency AC current-sourcing driving that can feed electrical loads with a constant current that is independent of load resistance. The driver is a self-oscillating inverter that includes a resonant network comprising a resonant capacitor and a resonant inductor. A current comparing and toggling circuit (CCTC) is used to generate the control signals of the inverter's power switches. Also included in the system is a DC blocking capacitor that prevents the DC voltage from reaching the resonant network.

19 Claims, 10 Drawing Sheets

U.S. PATENT DOCUMENTS

| | | |
|---|---|---|
| 4,630,005 A | 12/1986 | Clegg et al. |
| 4,782,268 A | 11/1988 | Fähnrich et al. |
| 4,798,997 A | 1/1989 | Egami et al. |
| 4,808,887 A | 2/1989 | Fähnrich et al. |
| 4,857,806 A | 8/1989 | Nilssen |
| RE33,057 E | 9/1989 | Clegg et al. |
| 4,920,299 A | 4/1990 | Presz et al. |
| 4,949,013 A | 8/1990 | Zuchtriegel |
| 4,959,591 A | 9/1990 | Hirschmann |
| 4,973,885 A | 11/1990 | Kerwin |
| 5,300,860 A | 4/1994 | Godyak et al. |
| 5,325,024 A | 6/1994 | Piejak et al. |
| 5,349,270 A | 9/1994 | Roll et al. |
| 5,359,263 A | 10/1994 | Roberts |
| 5,381,073 A | 1/1995 | Godyak et al. |
| 5,408,162 A | 4/1995 | Williams |
| 5,416,387 A * | 5/1995 | Cuk et al. ............... 315/209 R |
| 5,461,286 A | 10/1995 | Hirschmann |
| 5,512,801 A | 4/1996 | Nilssen |
| 5,521,467 A | 5/1996 | Statnic et al. |
| 5,548,189 A | 8/1996 | Williams |
| 5,578,907 A | 11/1996 | Tao et al. |
| 5,581,161 A | 12/1996 | Gong |
| 6,072,710 A | 6/2000 | Chang ........................ 363/132 |
| 6,114,814 A * | 9/2000 | Shannon et al. ............. 315/219 |
| 6,452,344 B1 * | 9/2002 | MacAdam et al. ......... 315/307 |
| 6,522,089 B1 * | 2/2003 | Duong et al. ............... 315/308 |
| 6,628,093 B2 * | 9/2003 | Stevens ..................... 315/291 |
| 6,703,796 B2 * | 3/2004 | Che-Chen et al. .......... 315/291 |
| 2002/0113556 A1 | 8/2002 | Tao et al. ................... 315/219 |

* cited by examiner

SELF-OSCILLATING CONSTANT-CURRENT GAS DISCHARGE DEVICE LAMP DRIVER AND METHOD

REFERENCE TO RELATED APPLICATIONS

The present application is the subject of Provisional Application Ser. No. 60/384,079 filed May 31, 2002.

FIELD OF THE INVENTION

The present invention relates to the field of power switching inverters. More particularly, the present invention relates to a method and apparatus for generating a high frequency AC current for driving linear or nonlinear loads, and in particular for non-thermionically driving gas discharge device lamps.

BACKGROUND OF THE INVENTION

Several types of switch mode converters and inverters are currently widely used for DC-to-DC, DC-to-AC, AC-to-DC and AC-to-AC power conversion. Certain loads need special drive signals in order to optimized their performance and maximize the system's efficiency. For example, fluorescent lamps need to be driven by a source that has a high output impedance to stabilize their operating point, and by high frequency sign to increase their light output. Accordingly, an inverter driving a fluorescent lamp must have a current source nature (as opposed to voltage source characteristic), such that the magnitude of its output current is relatively independent of the resistance of the lamp. One way to implement a high output impedance driver is to apply an electromagnetic ballast that is based on a large inductor, which is placed in series with the power line voltage. An alternative and preferred approach is to generate a high frequency signal by a switch mode inverter since the efficacy of the lamp increases when driven by a high frequency current. A typical prior art solution is illustrated in FIG. 1.

FIG. 1 depicts a line rectifier (1), a power factor correction section (PFC), a half-bridge inverter (Q1, Q2) that is operated by a gate drive and a controller that generates the gate signals. The requirement for a high impedance drive is accomplished by placing an inductor (Ls) in series with the lamp. At high frequency, the inductor exhibits a relatively high impedance that controls the magnitude of the current that is fed to the lamp. The purpose of the capacitor Cs is DC decoupling while Cp is used to generate a high voltage needed for igniting the lamp. The high peak voltage that is required for igniting the lamp is generated by driving the inverter during the start up stage, by a frequency that is close to the resonant frequency formed by the resonant network Ls, Cp. As a result, the voltage across the resonant capacitor Cp will build up to help ignite the lamp. The effect of the blocking capacitor Cs on the resonant frequency is small since its capacitance is much larger than that of Cp. Once the lamp ignites, the drive frequency is changed to the normal operating frequency. The electronic ballast of FIG. 1 can be used to drive a number of lamps. Each lamp will have to have its interface network including Cs, Ls and Cp.

The commercial realization of the electronic ballast of FIG. 1 is rather costly since there is a need for a dedicated controller as well as a gate driver for both the high side and low side switches of the half bridge. Furthermore, in a multi lamp configuration there is a need to add an interface network (Ls, Cs, Cp) for each lamp. A lower cost solution that is based on a self-oscillating inverter is depicted in FIG. 2. In this prior art approach, the circuit acts as an oscillator, generating its own drive signals to the gates of the power MOSFET switches. Consequently the Bill Of Material (BOM) of this ballast is far lower than that of FIG. 1. However, the driver of FIG. 2 needs to be designed for each particular power level. For example, L. S. Nerone ("A mathematical model of the class D converter for compact fluorescent lamps," IEEE Transactions on Power Electronics, Vol. 10, No. 6, 708–715, 1995) teaches how to select the components of the self-oscillating driver for a given (single) lamp. R. K. Pavao et al. (R. K. Pavao, F. E. Bisogno, A. R. Seidel, R. N. do Prado, "Self-oscillating electronic ballast design based on the point of view of control system," Industry Applications Conference, 2001. Thirty-Sixth IAS Annual Meeting. Conference Record of the 2001 IEEE, Vol. 1, 211–217, 2001) describes a self-oscillating ballast for a single fluorescent lamp. The drawback of the self oscillating ballast, according to the design known in the art (FIG. 2), is that it is specific to a single lamp, requiring a ballast per lamp. Since, however, many applications call for multi-lamp fixtures, it would be highly advantageous to have a self-oscillating fluorescent lamp driver that can operate a number of lamps. This will reduce dramatically the cost and will increase the reliability of the system. Furthermore, it would be also highly advantageous if the same fluorescent lamp driver can operate one lamp or more. This will lower the number of models that need to be manufactured and stocked, decreasing thereby the production, storage and distribution cost of the product. It will be further be highly advantageous if the same driver circuit will be able to operate a number of lamps with no need to add component per lamp. It will also be advantageous if the efficiency of the driver is kept high when operating one, two or any number of lamps (up to some practical limit).

All of the methods described above have not yet provided a simple and economic way for constructing a self-oscillating fluorescent lamp driver that can ignite and operate one or more lamps while maintaining low cost and high efficiency.

It is the objective of the present invention to provide a method and apparatus for a self-oscillating inverter to produce a high frequency current that will be constant and independent of the load i.e. the number of lamps operated by it (up to some practical limit).

It is another objective of the present invention to provide a method and apparatus to maintain high efficiency of a fluorescent lamp driver when operating a single or a number of lamps.

It is yet another objective of the present invention to provide a sufficiently high ignition voltage that will ignite the lamps connected to the driver.

It is still another object of the present invention to extend the reliability of fluorescent lamp drivers.

Other objects and advantages of the invention will become apparent as the description proceeds.

SUMMARY OF THE INVENTION

The present invention is directed to a high frequency ac current-sourcing driver that can feed electrical loads with a constant current that is independent of load resistance. The driver is a self-oscillating inverter that includes a resonant network comprising a resonant capacitor Cr and a resonant inductor Lr. A Current Comparing and Toggling Circuit CCTC is used to generate the control signals of the inverter's power switches. Also included in the system is a DC blocking capacitor that prevents the DC voltage from reaching the resonant network.

The load is connected in parallel to the resonant capacitor Cr and will typically include (but not limited to) a number of serially connected fluorescent lamps. According to this invention, and based on the disclosed original analytical derivation, the components of the resonant network and the CCTC are selected such that the circuit will oscillate at the desired pre-selected switching frequency and will feed the required current to the load.

The CCTC can be realized by a multi-winding transformer or by an electronic circuit of various optional designs. Its purpose is to flip the control signals of the power switches whenever the input signal drops to the level of the desired output current. This, according to the present invention will cause the driver to behave as a current source.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
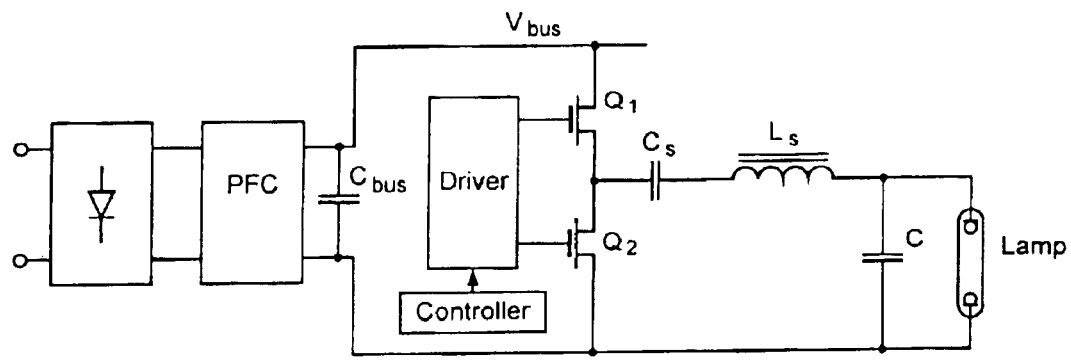
FIG. 1 (prior art) illustrates a high-frequency electronic ballast for fluorescent lamps based on a forced driven half bridge inverter.
Figure 2:
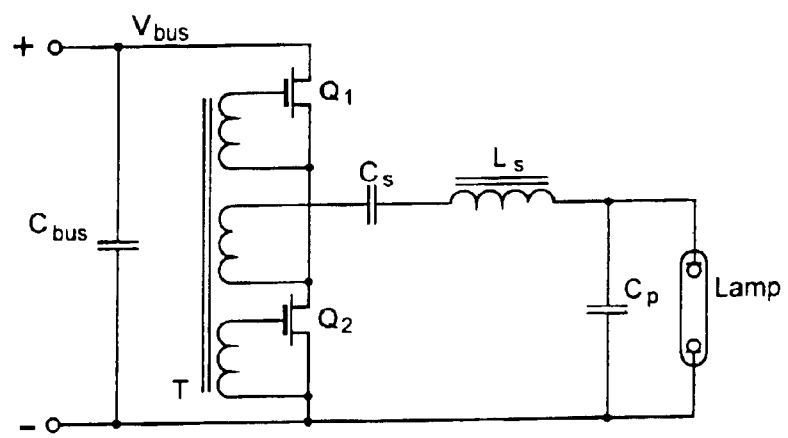
FIG. 2 (prior art) illustrates a high-frequency electronic ballast for fluorescent lamps based on a self oscillating inverter.
Figure 3:
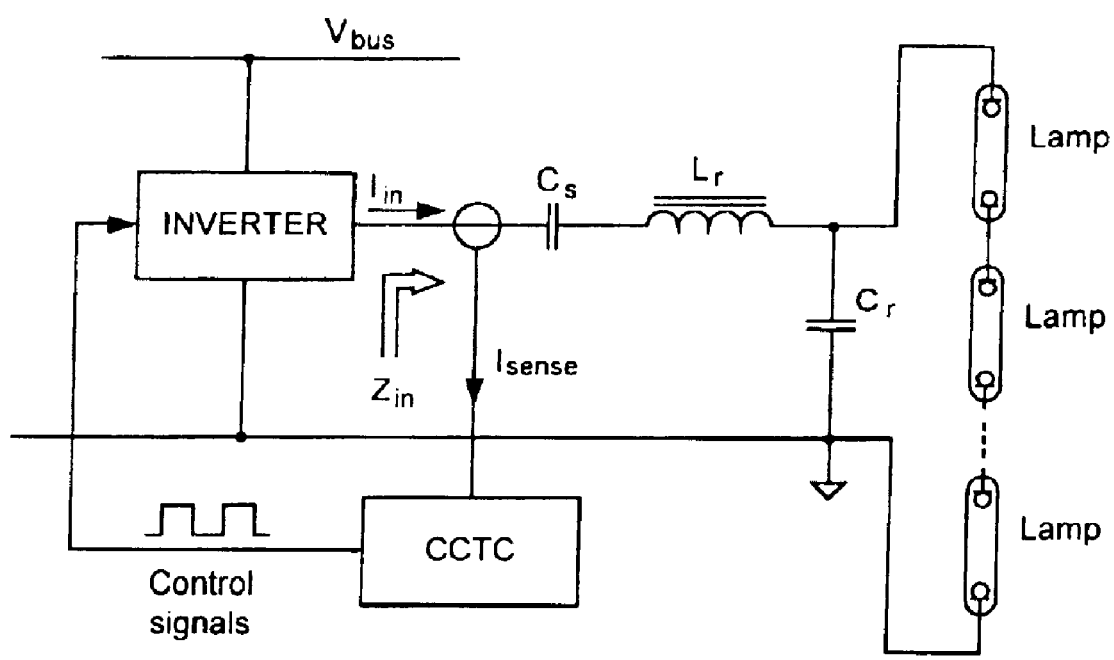
FIG. 3 illustrates a high-frequency electronic ballast for fluorescent lamps based on a self oscillating inverter according to a preferred embodiment of the present invention.

The present invention is directed to a high-frequency self-oscillating current-sourcing inverter. FIG. 3 illustrates a driver according to a preferred embodiment of this invention. It includes an inverter and a resonant network. The inverter drives an inductor Lr that is placed in series with a capacitor Cr to which the load (one lamp or more) is connected in parallel. The driver may also include a blocking capacitor Cs whose purpose is to pass only the ac current to the load while filtering out the dc component. The capacitor is needed when the inverter's output includes a dc component such as in the case of a half bridge inverter. The capacitance of Cs is normally much larger than that of Cr so as to reduce the ac voltage drop across it. It can thus be assumed to a good approximation that the resonant frequency of the inverter is $$\omega_0 = \frac{1}{\sqrt{L_r C_r}}.$$

A Current Comparing and Toggling Circuit CCTC measures the input current of the resonant network and generates the control signals of the inverter's power switches.

Figure 4:
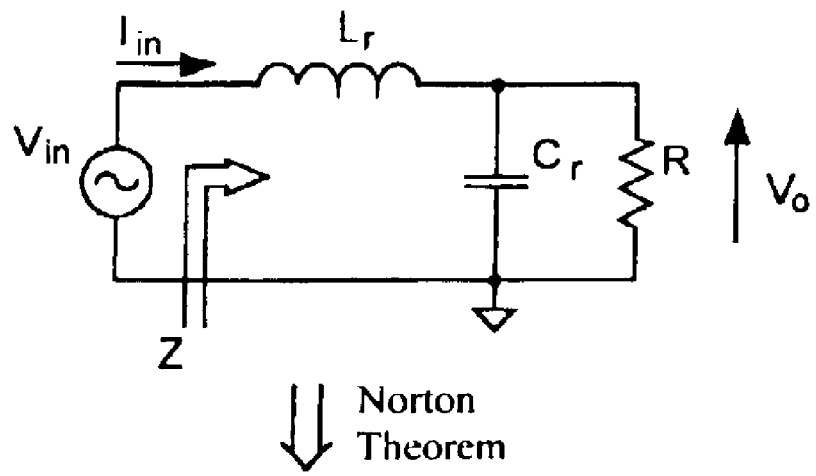
FIG. 4 illustrates the development of an equivalent circuit of the resonant network of FIG. 3 according to Norton's theorem.
Figure 4:
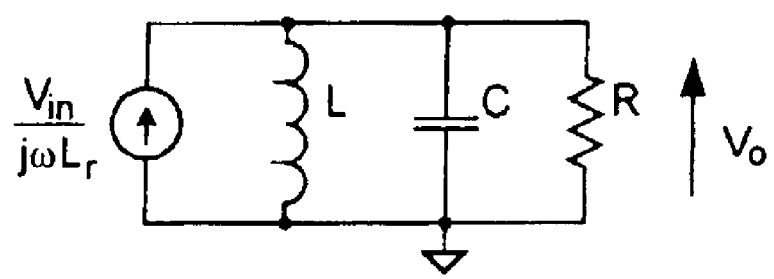
Figure 4:
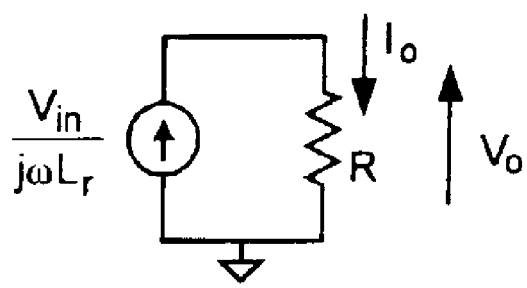

When properly designed per the disclosed theory, the switching frequency of the inverter will be equal to the resonant frequency. In such a case, as shown below, the resonant circuit acts as a current source, delivering a constant current to the load independent on the resistance of the load. The magnitude of the current, as a function of circuit parameters, is clearly revealed by transforming the generic half bridge inverter and resonant network into an equivalent circuit according to Norton's theorem (FIG. 4). When the circuit is driven at resonant frequency, the impedance of the parallel resonant network (Lr, Cr) is infinitely high and consequently, all the current of the equivalent current source is flowing into the load. That is, the equivalent circuits reveals that $I_O$ is a function of the resonant elements only and independent of the load resistance R. From FIG. 4:

$$I_o = \frac{v_{in}}{\omega_0 L_r} = \frac{v_{in}}{\sqrt{\frac{L_r}{C_r}}} \tag{1}$$

where $\omega_0 = \frac{1}{\sqrt{L_r C_r}}$

The characteristic impedance $Z_r$ is defined as:

$$Z_r \equiv \sqrt{\frac{L_r}{C_r}} \tag{2}$$

It is thus found that, at the resonant frequency, the output current to the load ($I_O$) is equal to $$\frac{V_{in}}{Z_r}$$

and independent of R. It is also observed that when R is very large (e.g. the fluorescent lamps resistance prior to ignition), the voltage across $C_r$ will become very large (FIGS. 3, 4). Hence, the driver is capable of automatically self-generating the high voltage needed for igniting fluorescent lamps.

The input impedance $Z_{in}$ of the loaded resonant section (FIGS. 3, 4) is:

$$z_{in} = j\omega L + \frac{R}{j\omega RC + 1} = \frac{-\omega^2 LCR + j\omega L + R}{j\omega RC + 1} \tag{3}$$

and in the case that the circuit is driven at the resonant frequency ($\omega=\omega_0$):

$$z_{in} = \left. \frac{j\omega L}{j\omega RC + 1} \right|_{\omega=\omega_0} = \frac{jZ_r}{j\frac{R}{Z_r}+1} \tag{4}$$

Consequently, the input current to the resonant section ($I_{in}$) will be:

$$I_{in} = \frac{V_{in}}{Z_{in}} = V_{in}\frac{j\frac{R}{Z_r}+1}{jZ_r} = \frac{jR+Z_r}{jZ_r^2}V_{in} \tag{5}$$

and the magnitude of $I_{in}$ will:

$$|I_{in}| = V_{in}\frac{\sqrt{R^2+Z_r^2}}{Z_r^2} \tag{6}$$

Based on (6), one can now derive the output voltage ($V_o$) to input voltage ($V_{in}$) transfer ration:

$$V_o = I_o R \tag{7}$$

$$I_o = \frac{V_{in}}{Z_r}; V_o = \frac{V_{in}}{Z_r}R \tag{8}$$

Which implies:

$$\frac{V_o}{V_{in}} = \frac{R}{Z_r} \tag{9}$$

It should be noted that when $$\frac{V_o}{V_{in}} > 1$$

(a relatively low bus voltage as compared to the voltage drop across the serially connected lamps) then $R > Z_r$.

The phase of the input current $I_{in}$, referred to the input voltage is found by dividing the input voltage by the impedance Z:

$$I_{in} = \frac{V_{in}}{Z_r} = \frac{\left(\frac{R}{Z_r}-j\right)}{1} = \frac{V_{in}}{Z_r^2}R\left(1-j\frac{Z_r}{R}\right) \tag{10}$$

from which:

$$\varphi = tg^{-1}\left(-\frac{Z_r}{R}\right) \tag{11}$$

For $V_o > V_{in}$ $\psi$ is small, and since:

$$\varphi \approx tg\varphi \text{ one finds } \varphi \approx -\frac{Z_r}{R} \tag{12}$$

Applying the first harmonics approximation, $V_{in}$ (FIG. 5) is the first harmonic components of the square-wave generated by the switches of the half bridge inverter ($V_{inv}$). Consequently, the angel $\psi$ is the phase shift between the inverter's square wave and the input current. The magnitude of the input current ($I_x$) at the commutation time is found with reference to FIG. 5 as follows:

The peak value of the input current is:

$$I_{in\,max} = V_{in\,max}\frac{\sqrt{R^2+Z_r^2}}{Z_r^2} \tag{13}$$

For $V_o > V_{in} \rightarrow Z_r^2 < R^2$ (14)

Hence:

$$I_{in\,max} = V_{in\,max}\frac{R}{Z_r^2} \tag{15}$$

$$I_x = I_{in\,max}\sin\varphi = V_{in\,max}\frac{R}{Z_r^2}\left(-\frac{Z_r}{R}\right) = V_{in\,max}\frac{1}{Z_r} \tag{16}$$

Applying (1):

$$I_x = \frac{V_{in\,max}}{Z_r} = I_{o\,max} \tag{17}$$

Figure 5:
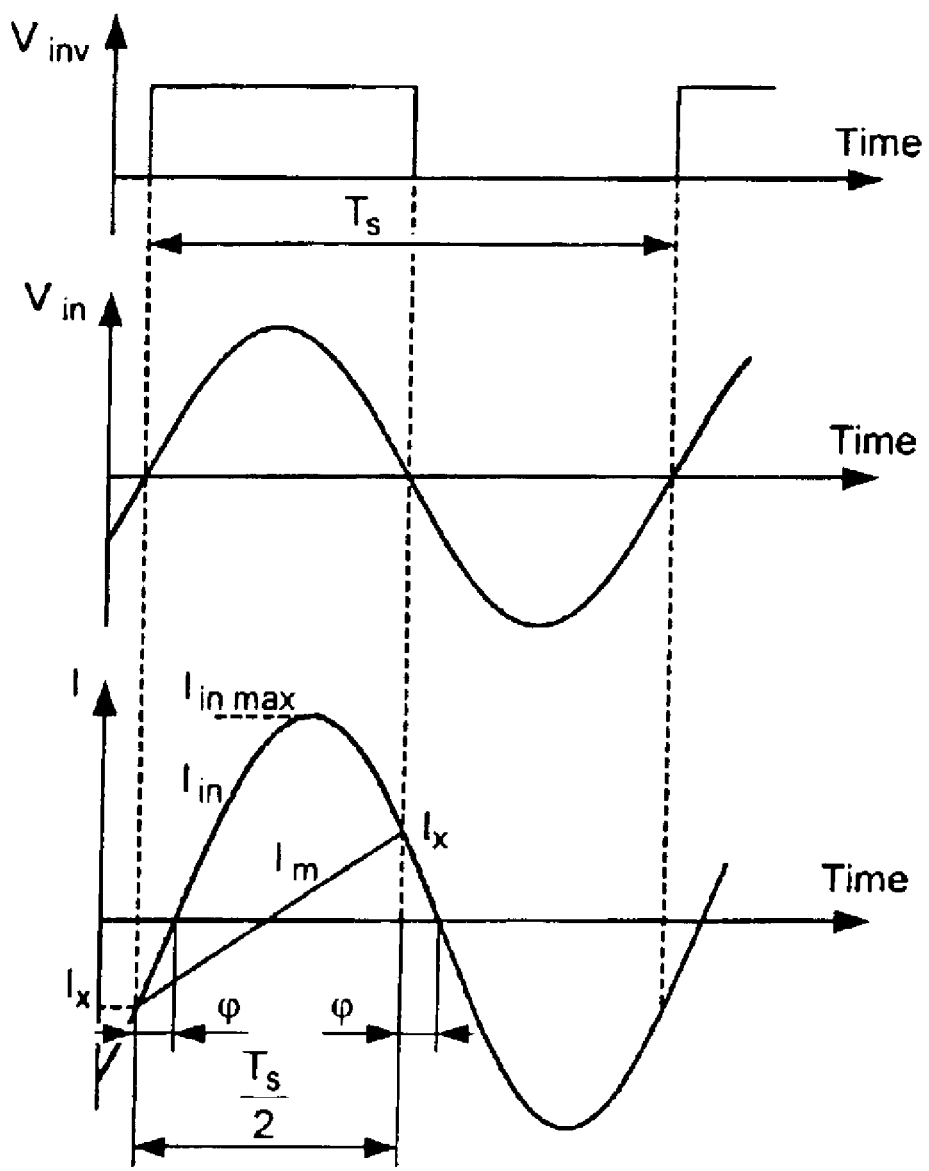
FIG. 5 depicts the basic voltage and current waveform of the driver of FIG. 3.

This original and innovative analytical result imply that a constant current, namely a load independent operation, can be achieved by forcing a commutation of the input square wave when the instantaneous input current drops again to the level of the maximum output current (FIG. 5).

If $V_{in}$ is derived from the square wave of a half bridge and Cs is a blocking capacitor, (FIG. 3) then:

$$V_{in\,max} = \frac{V_{bus}}{2}\frac{4}{\pi} = V_{bus}\frac{2}{\pi} \tag{18}$$

In case of a full wave inverter the amplitude of the Vin will be twice higher. The former equation is based on the first harmonic approximation that is justified by the fact that the resonant network will filter out the higher harmonics of the square wave.

It follows then:

$$I_{in\,max} = V_{in\,max} \frac{R}{Z_r^2} = V_{bus} \frac{2}{\pi} \frac{R}{Z_r^2} \quad (19)$$

Figure 6:
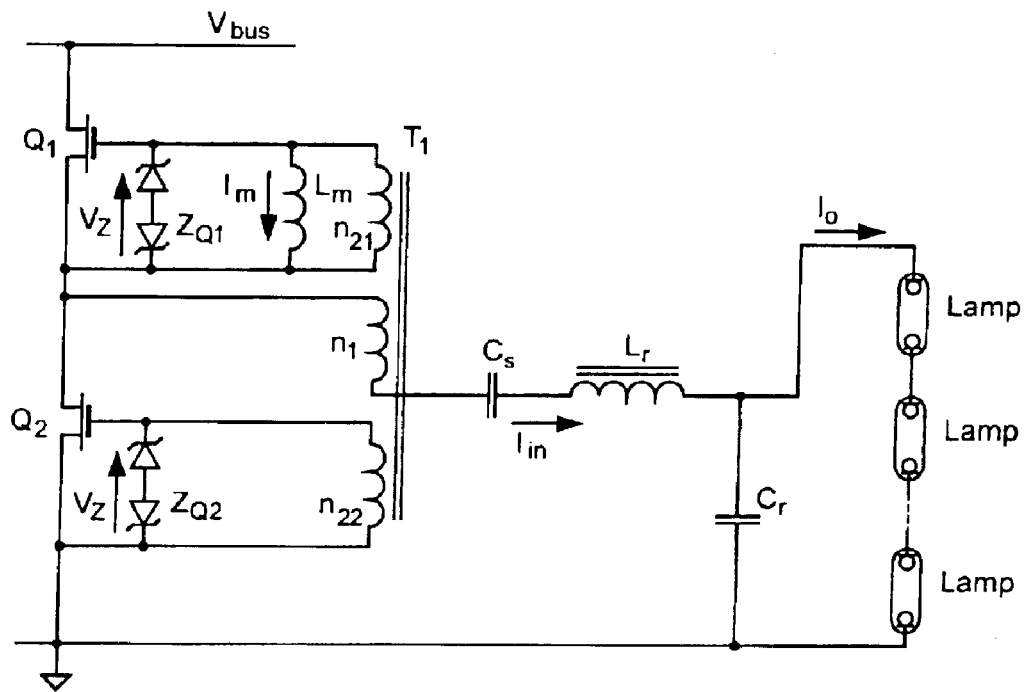
FIG. 6 illustrates a high-frequency electronic ballast for fluorescent lamps based on a self oscillating inverter according to a preferred embodiment of the present invention in which the inverter is a half bridge topology and the CCTC is realized by a transformer.

One optional way to realize the CCTC is by means of a multi winding transformer (FIG. 6). In this case, the transistors of a half bridge inverter are driven by a transformer (T) that includes at least three windings. Two windings (n21, n22) are shunted by Zener diodes, to fix the gates' voltages, and are connected to the gates of the power MOSFETS. The third winding (n1) is placed in series with inductor Lr. Consequently the current flowing through that winding is the current coming out of the half bridge circuit. The mechanism of commutation of the two transistors, in this case, is similar to that known in the art for a self-oscillating inverter (L. S. Nerone, "A mathematical model of the class D converter for compact fluorescent lamps," IEEE Transactions on Power Electronics, Vol. 10, No. 6, 708–715, 1995). The commutation instance is triggered by the interaction of the current building up in the magnetization inductance of the transformer T and the input current that passes through the third winding of the transformer T (n1). In particular, the commutation process is initiated when the two are equal. It should be noted that shape of the input current is sinusoidal whereas the magnetization current increases linearly due to the fixed voltage imposed by the Zener voltage (FIG. 5).

The magnitude of the intersection current ($I_x$) referred to the windings n2 of the transformer (FIGS. 5, 6):

$$I_x = \frac{V_z T_s}{L_m 4} n \quad (20)$$

where: $V_Z$ is the clamping Zener diode voltage, $L_m$ is the magnetization inductance of the transformer as measured at the n2 windings, $T_S$ is the period of the oscillation and $$n = \frac{n_2}{n_1}$$

To achieve constant load current of the resonant half bridge, according to this invention, we set:

$$I_x = I_{o\,max} = \frac{V_{in\,max}}{Z_r} = \frac{V_{bus} 2}{\pi Z_r} = \frac{V_z T_s}{4 L_m} n \quad (21)$$

Hence, to achieve a constant load current $I_o$, one needs to choose $L_m$ according to:

$$L_m = \frac{V_z T_s n}{4 I_{o\,max}} \quad (22)$$

$$\text{where } T_s = \frac{1}{f_s} = 2\pi \sqrt{L_r C_r} \quad (23)$$

while complying with equation (1).

It is thus evident that the self-oscillating current-sourcing inverter built according to this invention will posses many desirable characteristics when used as a fluorescent lamp driver. These include, but are not limited to:

The ability to drive one or a number of lamps with same driver.

Simplicity and low cost due to the fact that there is no need to add more components as for driving additional lamps.

Ability to generate high ignition voltage sufficient for cold ignition (no need to warm up filaments, e.g.; non-thermionic), and consequently, Ability to run a fluorescent lamp even if one or two of its filaments are broken.

Ability to operate number of lamps in series even if the bus voltage is low, and consequently, Ability to use low voltage transistors for the half bridge.

Increasing the efficacy of fluorescent lamp by driving them at high frequency.

Lowering the component count of a fluorescent lamp driver and hence increasing the reliability of the system.

Figure 7:
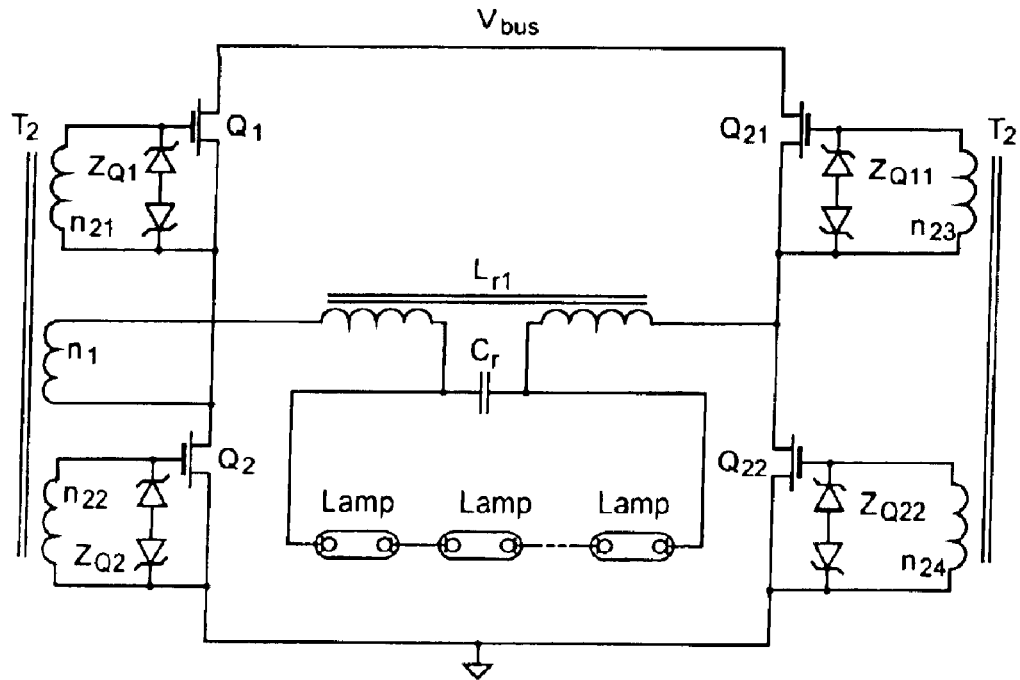
FIG. 7 illustrates a high-frequency electronic ballast for fluorescent lamps based on a self oscillating inverter according to a preferred embodiment of the present invention in which the inverter is a full bridge topology and the CCTC is realized by a transformer.

A skilled person will recognize, other additional implementation of proposed invention are clearly possible. FIG. 7 depicts, for example, an implementation of proposed invention in which the inverter is built around a full bridge topology. This implementation will be useful for high power cases in which the total power delivered to the lamps exceeds the practical capability of the half bridge configuration.

Figure 8:
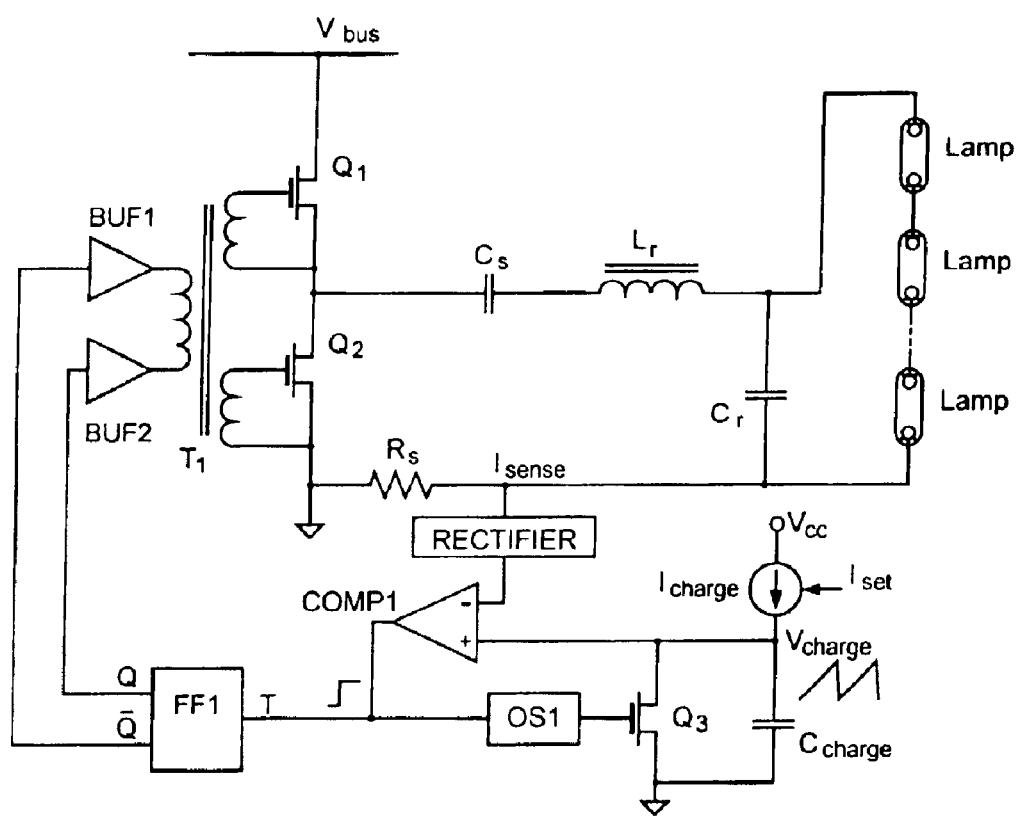
FIG. 8 depicts a high-frequency electronic ballast for fluorescent lamps based on a self oscillating inverter according to a preferred embodiment of the present invention in which the inverter is a half bridge topology and the CCTC is realized by an analog electronic circuit and the gate drive is via a transformer.

FIG. 8 illustrates another possible implementation of present invention in which a dedicated discrete analog controller circuit realizes the CCTC. In this case, the ramp signal is realized by a capacitor (Ccharge) charged by a constant current (Icharge) and the commutation is forced by a flip-flop (FF1) whenever the sense voltage that represent the input current is equal to the ramp signal. An auxiliary circuit (one shot OS1 and transistor Q3) is then used to discharge the capacitor Ccharge at the commutation instance. The Power MOSFET gates are driven by a transformer that is fed by the complementary signals of FF1.

Figure 9:
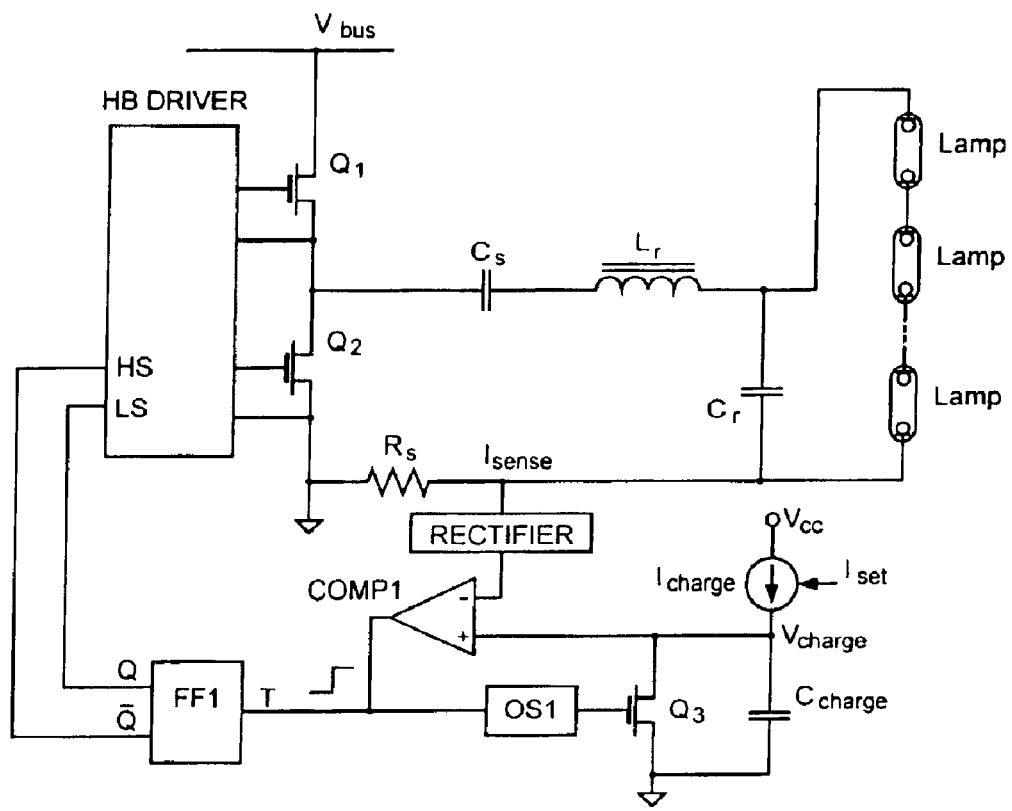
FIG. 9 depicts a high-frequency electronic ballast for fluorescent according to a preferred embodiment of the present invention in which the inverter is a half bridge topology, the CCTC is realized by an analog electronic circuit and the gate drive is via a dedicated IC.

FIG. 9 shows another optional version of the driver shown in FIG. 8 in which the gate driver are implemented by a dedicated IC (HB DRIVER).

Figure 10:
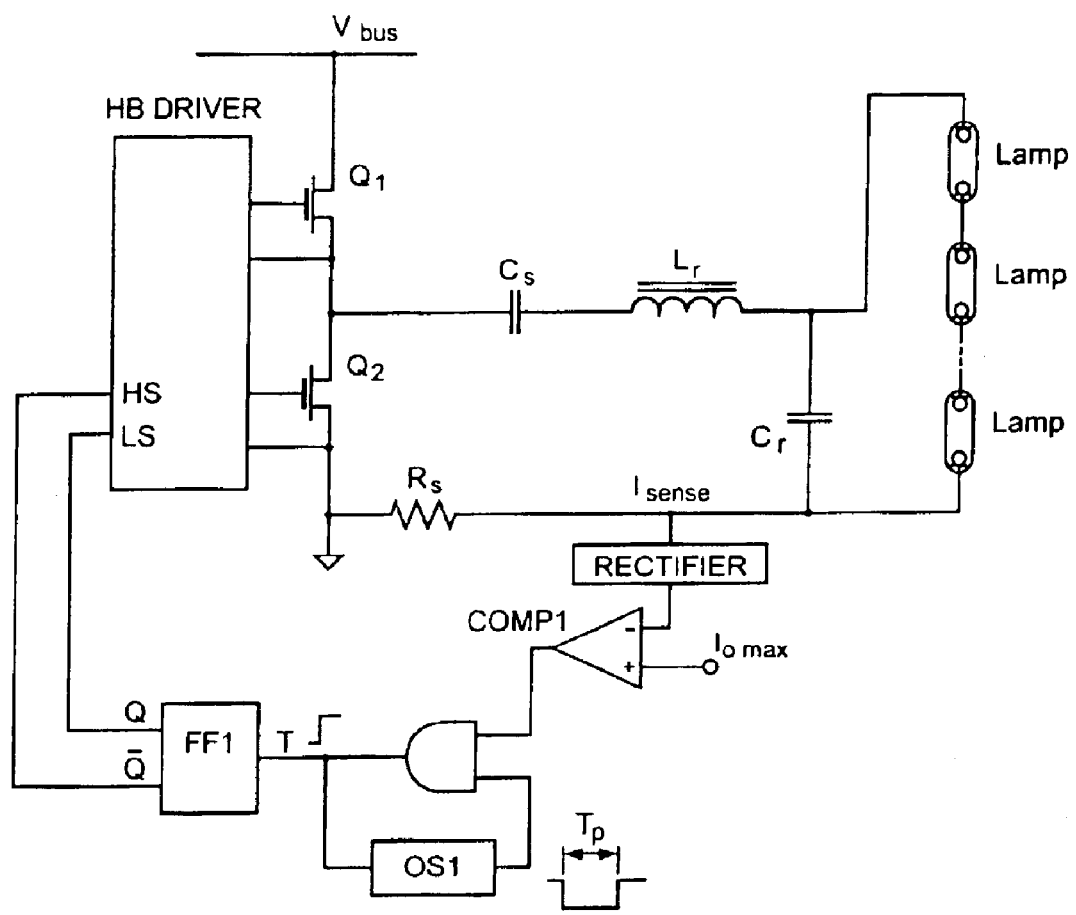
FIG. 10 illustrates a high-frequency electronic ballast for fluorescent according to a preferred embodiment of the present invention in which the inverter is a half bridge topology, the CCTC is realized by an analog electronic circuit that includes a blanking pulse.

FIG. 10 shows yet another optional embodiment of present invention in which the input current is compared to the trigger current per his invention (Iomax) and a blanking pulse (Tp) is used to prevent false triggering. The width of the pulse should be approximately one quarter of the switching cycle.

Figure 11:
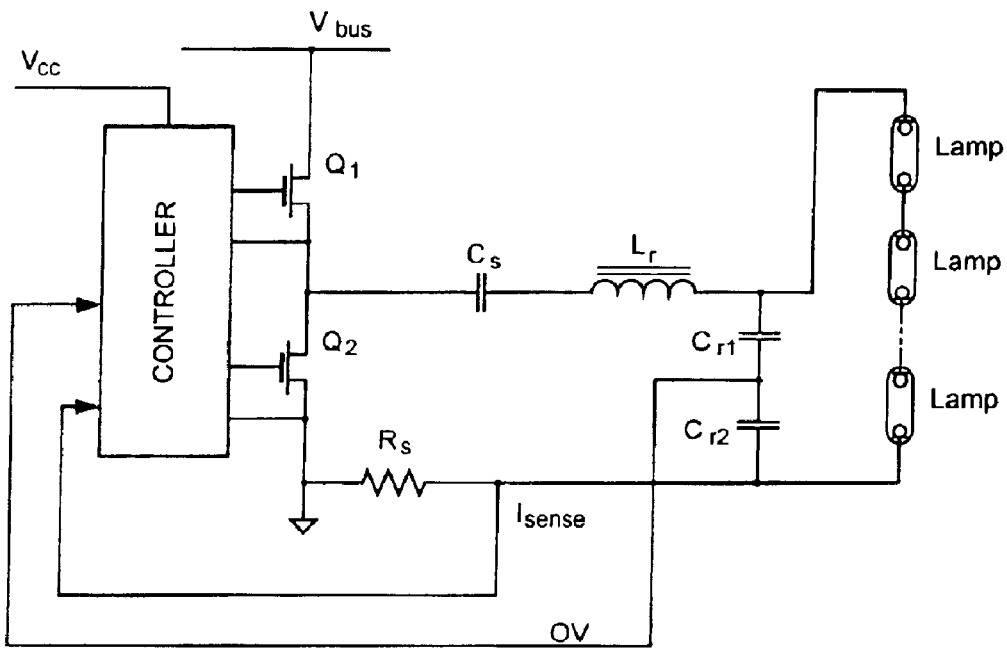
FIG. 11 shows a high-frequency electronic ballast for fluorescent according to a preferred embodiment of the present invention in which the inverter is a half bridge topology and the CCTC and gate drivers are combined and implemented as a dedicated IC.

FIG. 11 depicts an additional optional implementation of present invention in which the controller is realized as an IC (CONTROLLER). This can improve the overall performance from the economical and performance points of view. For example, as shown FIG. 11, over voltage protection can be implemented by sensing the voltage of the resonant capacitor (via a capacitor divider, OV) and shutting off the circuit whenever the voltage exceeds a predetermined value.

Figure 12:
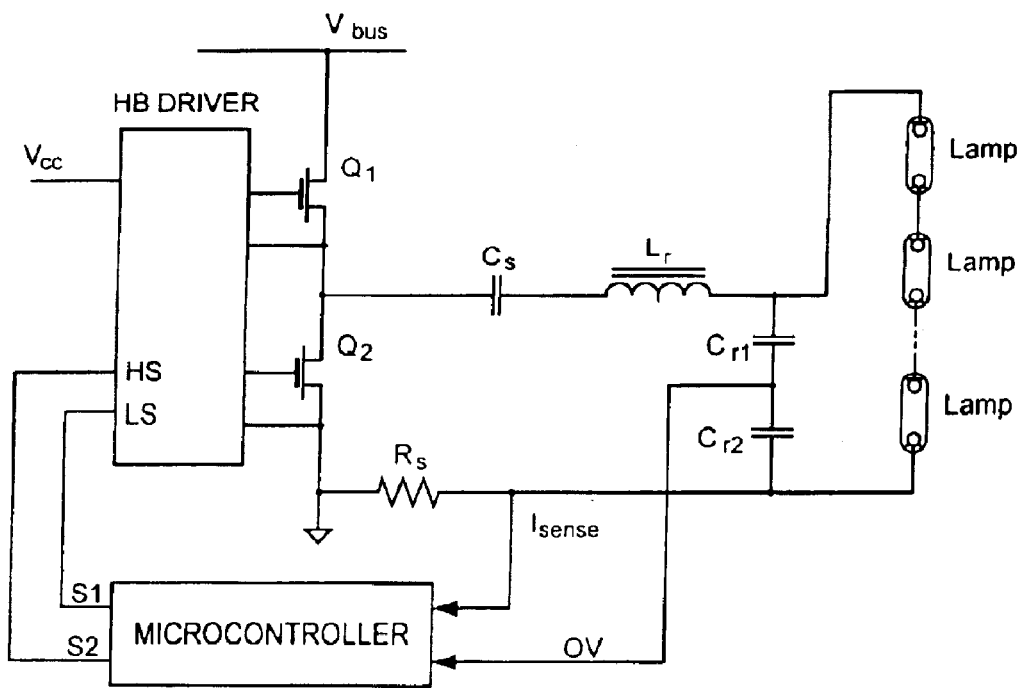
FIG. 12 shows a high-frequency electronic ballast for fluorescent according to a preferred embodiment of the present invention in which the inverter is a half bridge topology and the CCTC is implemented by a microcontroller.

FIG. 12 demonstrates an optional digital implementation of the driver's controller in which the algorithm of commutation per this invention is realized as a software program.

Figure 13:
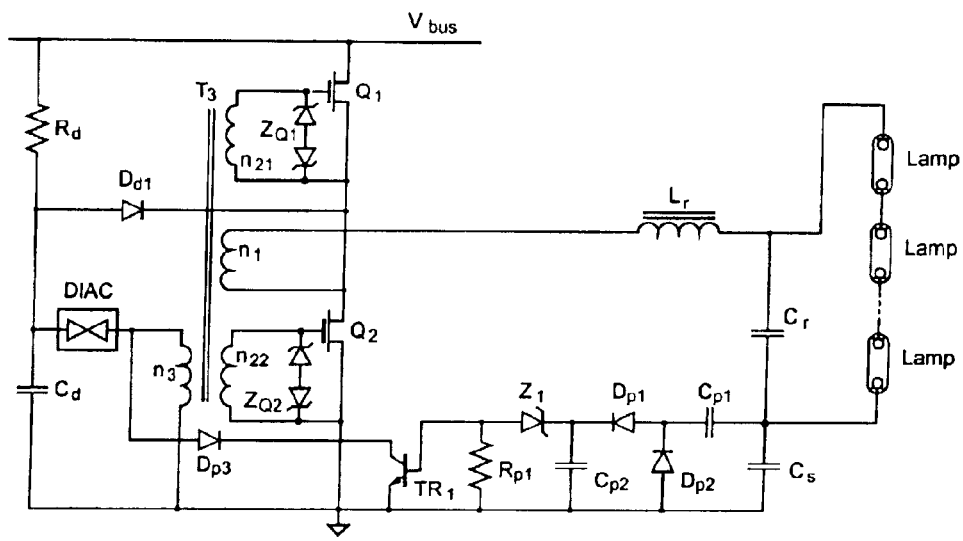
FIG. 13 illustrates a high-frequency electronic ballast for fluorescent according to a preferred embodiment of the present invention which includes an over voltage protection circuitry.
Figure 14:
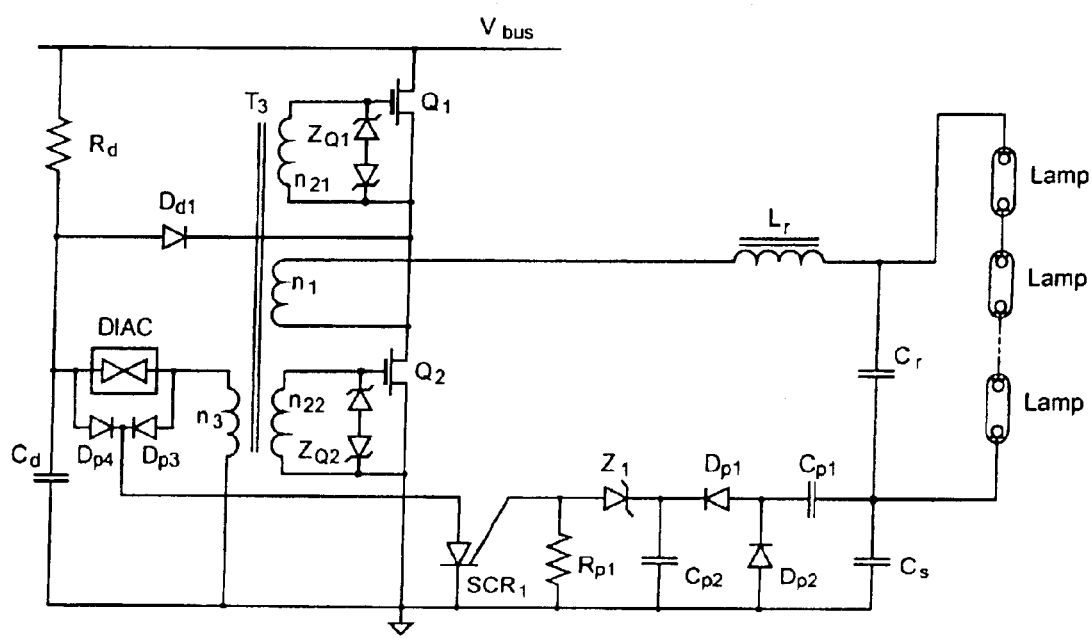
FIG. 14 depicts a high-frequency electronic ballast for fluorescent according to a preferred embodiment of the present invention which includes an over voltage protection circuitry that will latch when activated.

FIG. 13 illustrates one optional embodiment of the invention when applied as a fluorescent lamp driver, including a starting circuit and over voltage protection. Feeding to the commutation transformer T initial pulsed via a Diac circuit sub circuit starts the oscillation. A resistor Rd3 charges a capacitor Cd until the trigger voltage of the Diac is reached. At this point, the Diac breaks down and a pulse is fed to an auxiliary winding n3 of the transformer T. This starts the oscillation of the circuit. If the trigger failed, the Diac will keep generating pulses until the inverter starts to self oscillate. Prior to lamp ignition, or if lamps are broken or not inserted in circuit, the self-oscillating current-sourcing fluorescent lamp driver of this invention will develop a high current through the resonant elements. If this extra stress lasts for an appreciable length of time, the circuit may be harmed. The driver is protected against this over current by the circuit elements Dp1, Dp2, Z1, Rp2, Cp1, Cp2 and TR1. Since the voltage across Cs is proportional to the resonant current, it is used as a measure of the current in circuit. The ac voltage across Cs is rectified, filtered and then applied to trigger the transistor that, when turned on, will block the oscillations. As will be apparent to persons trained in the art, proper selection of the values of the protection components will determine the length of time that the ignition state will persist before the driver shuts off, and the length of time before it turns on again. Another mode of protection is obtained (FIG. 14) by adding a pull down diodes Dp3 and a thyristor (SCR). In this case, once fired the SCR will hold in 'on' state by the charging resistor Rd. The circuit will reset only when disconnected from power. In the embodiment shown in FIG. 14, the overvoltage protection circuit will latch when activated.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A high frequency alternating current driver circuit for a gas discharge device load comprising:
    an inverter for generating an input square wave voltage,
    a resonant network having a resonant frequency and including a series inductor and capacitor, said load being connected across said capacitor, a current comparing toggling circuit for sensing instantaneous current to the load and forcing conversion of the input square wave voltage when said instantaneous input current drops to the level corresponding to a selected maximum output current.

2. An AC driver circuit for non-thermionically driving a gas discharge load, comprising:
    a switch mode inverter for generating a square wave voltage output,
    a resonant network having a resonant frequency and including a series inductor and capacitor, said capacitor being connected across said load, and
    a control circuit for causing the frequency of said inverter to be equal to the resonant frequency and said resonant circuit and act as a current source for delivering a constant current to said gas discharge load independent of the resistance of said gas discharge load,
    said control circuit comprising a current comparing and toggling circuit for commutating the inverter state such that the frequency of the input current to said resonant network is equal to the resonant frequency of the resonant network.

3. An AC driver circuit for driving a gas discharge load comprising:
    a switch mode inverter circuit having commutable states for generating a square wave voltage,
    a resonant circuit including a series inductor and capacitor connected to said switch mode inverter, and means connecting said gas discharge load across said capacitor,
    a circuit for supplying a control signal selected for maintaining constant current operation,
    a current comparing and toggling circuit for commutating the inverter state whenever the input current to said resonant circuit is equal to the level of said control signal.

4. The driver circuit defined in claim 3 wherein said selected level corresponds to the maximum current to said load.

5. The driver circuit defined in claim 3 wherein said current comparing and toggling circuit includes a transformer.

6. The driver of claim 3 wherein said current comparing and toggling circuit includes an analog controller.

7. The driver defined in claim 3 in which said current comparing and toggling circuit includes a microcontroller.

8. A method of non-thermionically driving a gas discharge load with a constant current that is independent of load resistance comprising: providing a self-oscillating inverter, providing a resonant network including a resonant inductor and a resonant capacitor connected across said load, a current comparing and toggling circuit for sensing the current input to said resonant network and commutating the inverter state whenever the input current to said resonant network is equal to a selected current of the load.

9. The method defined in claim 8 wherein the step of sensing current in said resonant circuit includes a transformer.

10. The method defined in claim 8 wherein said inverter includes a half bridge.

11. The method defined in claim 8 wherein said inverter includes a full bridge.

12. The method defined in claim 8 wherein said current comparing and toggling circuit includes an analog controller.

13. The method defined in claim 7 wherein said current comparing and toggling circuit includes a microcontroller.

14. A high frequency AC current sourcing driver circuit for driving electrical loads with a constant current that is independent of load resistance comprising a self=oscillating inverter circuit including power switches and a resonant network including a resonant inductor and a resonant capacitor, a current comparing and toggling circuit for sensing current in said resonant network and generating control signals for said power switches.

15. The drive circuit defined in claim 14 including a DC blocking capacitor series circuit with said resonant network.

16. The driver circuit defined in claim 14 wherein said load is a plurality of gas discharge tubes.

17. The driver circuit defined in claim 14 wherein said gas discharge device load includes at least three serially connected fluorescent tubes.

18. The driver circuit defined in claim 3 wherein said selected control signal is a voltage ramp.

19. The driver circuit defined in claim 3 wherein said selected control signal is a pulse.

* * * * *